US011875353B2

(12) United States Patent
Abadi et al.

(10) Patent No.: US 11,875,353 B2
(45) Date of Patent: Jan. 16, 2024

(54) SUPERVISED MACHINE LEARNING FOR DISTINGUISHING BETWEEN RISKY AND LEGITIMATE ACTIONS IN TRANSACTIONS

(71) Applicant: NCR Voyix Corporation, Atlanta, GA (US)

(72) Inventors: Shiran Abadi, Tel-Aviv (IL); Tamar Miriam Haizler, Kfar-Saba (IL)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 17/488,801

(22) Filed: Sep. 29, 2021

(65) Prior Publication Data
US 2023/0098204 A1    Mar. 30, 2023

(51) Int. Cl.
*G06Q 20/40* (2012.01)
*G06Q 20/38* (2012.01)
*G06N 20/00* (2019.01)
*G06F 18/24* (2023.01)

(52) U.S. Cl.
CPC ......... *G06Q 20/4016* (2013.01); *G06F 18/24* (2023.01); *G06N 20/00* (2019.01); *G06Q 20/382* (2013.01)

(58) Field of Classification Search
None
See application file for complete search history.

(56) References Cited

U.S. PATENT DOCUMENTS

| 2011/0066493 | A1* | 3/2011 | Faith | G06Q 20/40 705/44 |
| 2015/0046224 | A1* | 2/2015 | Adjaoute | G06Q 30/0202 705/7.31 |
| 2017/0140384 | A1* | 5/2017 | Zoldi | G06Q 20/4016 |
| 2021/0142126 | A1* | 5/2021 | Warrick, II | G06F 18/2411 |
| 2022/0284379 | A1* | 9/2022 | Adams | G06Q 20/047 |

* cited by examiner

*Primary Examiner* — Namrata Boveja
*Assistant Examiner* — Divesh Patel
(74) *Attorney, Agent, or Firm* — Schwegman Lundberg & Woessner, P.A.

(57) ABSTRACT

Risky actions versus non-risky actions in a transaction are identified and a fraud score associated with probabilities of the risky actions is updated accordingly for purposes of determining whether the transaction is likely or not likely to be associated with fraud. A machine-learning model is trained to predict the risky actions versus non-risky actions of a transaction based on the transaction features as a whole and compare the predicted action labels of risky and non-risky versus the actual actions taken in the transaction to calculate probabilities of risky actions taken and output a risk or fraud score based thereon. Higher probabilities correlate with lower risk scores and vice versus.

8 Claims, 3 Drawing Sheets

SUPERVISED MACHINE LEARNING FOR DISTINGUISHING BETWEEN RISKY AND LEGITIMATE ACTIONS IN TRANSACTIONS

BACKGROUND

Current loss prevention solutions treat every abnormal action in a transaction with the same severity, even if the abnormal action was merely to correct a known error associated with the transaction.

Existing solutions for cashier fraud do not distinguish well between human errors or required actions and fraudulent activities when analyzing actions that might indicated risks within a transaction. The solutions rely on simplistic rules to decide whether the actions taken during a transaction are legitimate. Such actions include, among others, voiding an item, overriding a price of an item, or returning an item. In order to give rules a more useful and tangible meaning, existing solutions often elevate a risk score with the increase in a counter value or an amount when abnormal actions are detected in a transaction.

For example, a transaction in which 10 items were voided is considered riskier than a transaction in which 2 items were voided. However, by taking these measures, legitimate actions or frequent mistakes may easily be marked as suspicious activity.

Some examples for such cases may include 1) voiding an expensive item could indicate a fraud but it could also indicate that the customer did not have enough cash to pay for the item during checkout; if a scan of 44 bottles of Coke® is voided and then 4 bottles of Coke® are scanned, this probably originated in a typing error by the customer or a cashier during checkout but existing solutions would consider this to as much riskier than voiding 5 or even 10 bottles of Coke®; 2) returning and receiving a refund for an electronic device is probably more likely than for a fresh produce item, however, according to existing solutions the electronic device is more expensive than the produce and thus the device's return would be scored as riskier; and 3) overriding a price for an item that is frequently sold as part of a promotion is more likely to be a true price correction, to grant the customer the discount that appears on the store shelf, however, when simply looking at the override amount, it would be scored as suspicious as another price reduction that is part of a true fraudulent activity.

Thus, existing solutions often catch a high-number of false positives where retailers audit transactions only to discover that the vast majority of the transactions are not associated with any fraud. In fact, the volume of false positives can cause the legitimate fraudulent transactions to go undetected and unaddressed.

SUMMARY

In various embodiments, system and a method for distinguishing between risky and legitimate transaction actions in a transaction are presented.

According to an aspect, a method for distinguishing between risky and legitimate transaction actions in a transaction is presented. Transaction events for a transaction at a transaction terminal are received and a target action that was processed in the transaction is identified from the transaction events. A probability of the target action being processed in view of transaction features of the transaction as a whole is calculated and a risk score for the target action is provided based on the probability to a fraud detection system.

DETAILED DESCRIPTION

Figure 1:
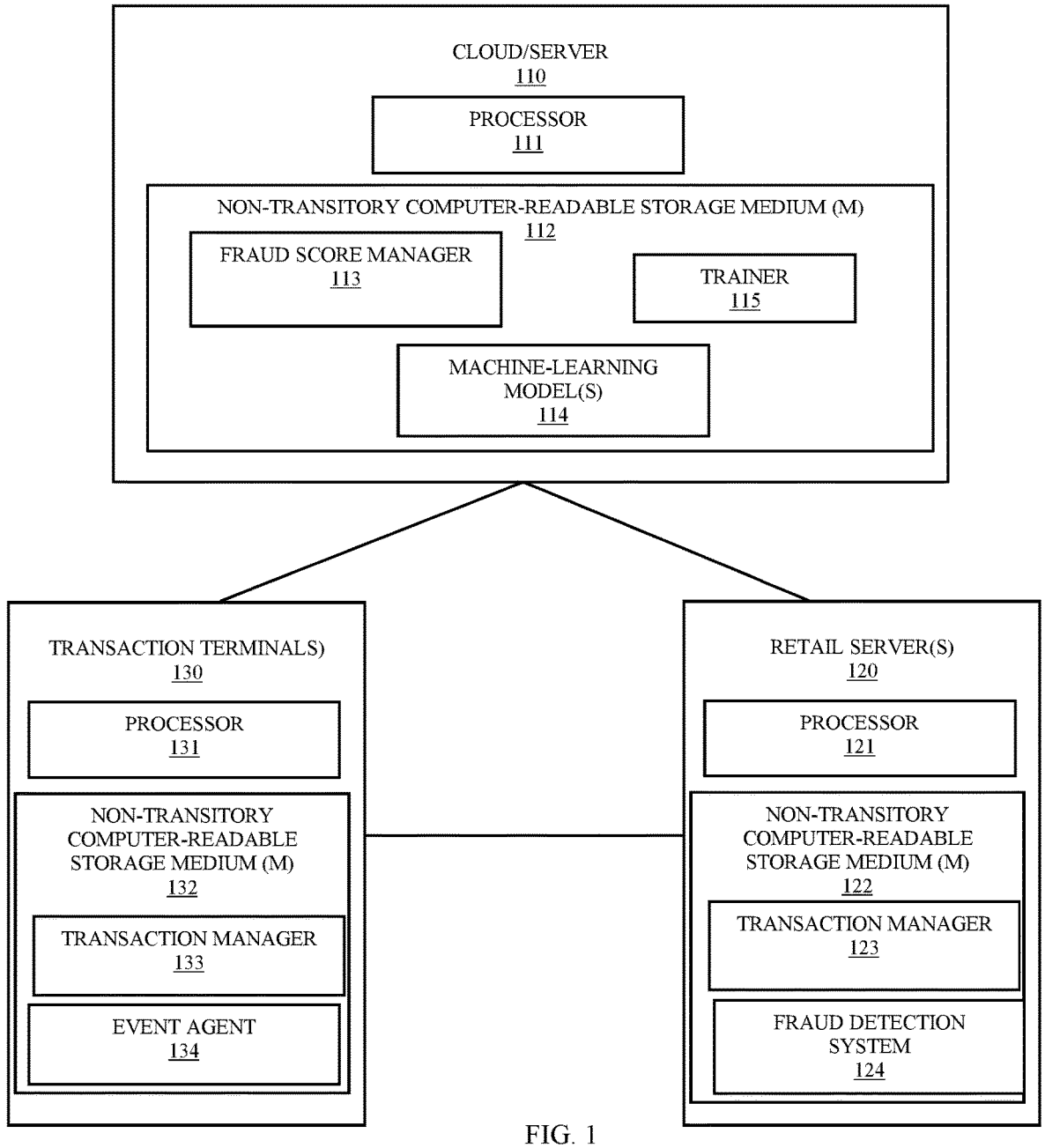
FIG. 1 is a diagram of a system for distinguishing between risky and legitimate transaction actions in a transaction, according to an example embodiment.

FIG. 1 is a diagram of a system 100 for distinguishing between risky and legitimate transaction actions in a transaction, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of distinguishing between risky and legitimate transaction actions in a transaction presented herein and below.

Research of fraudulent transactions indicates that there are more transaction actions beyond just what is conventionally believed to be good indicators of fraud (e.g., voids, price overrides, returns). Research also indicates that as many as 70% of transactions believed to be associated with fraud by retailers based on a specific transaction action are actually not fraud and are associated with correcting legitimate transaction mistakes. With system 100, retailers can focus and take action on the actual 30% of their transactions, which are associated with fraud for specific transaction actions and the retailers can substantially improve their transaction fraud identification and fraud detection systems.

Research has further revealed that 1.3% of items are voided, 0.1% of items have manual price overrides, and 0.05% of items are returned for any given average retailer. A model retailer was used in research that sold an average of 1.5 million items per day and approximately 19,500 items per day were considered to be risky solely based on voids during the day for these 19,500 items. It was further estimated that less than 1% of the transactions are actually associated with fraud. Because the retailer has based fraud on voided items only, most of the actual events associated with the transactions for the 19,500 items are likely the consequence of legitimate mistakes. Overlooking the context of events obscures truly risky activities in the retailer's transactions.

System 100 corrects these deficiencies associated with retailer's fraud detections system by analyzing transactions on the basis of target actions and calculating probabilities of actions within the transaction of the transaction. What is considered to be a target action is also expanded beyond just void actions, price override actions, and return actions to include payment tender type, repetitive items, and item weights within the context of other transaction properties detected within the corresponding transactions.

Specifically, some non-conventional transaction actions were identified as being relevant to fraud, such as a type of tender being used for transaction payment (e.g., credit card, debit card, cash, gift card, etc.) relative to transaction properties (e.g., transaction amount, item types for the items, total number of items, etc.), a repetitive occurrence of the same item in the transaction (is an item usually scanned multiple times or is it being scanned multiple times instead of a pricier item), weighted items (is a certain weight typical item), and other actions relative to transaction properties.

System 100 develops and trains one or more Machine-Learning Models (MLMs) that computes the probably of a target action within a given transaction. If the probability is high for a given target action (such as an item void), then the risk probability for that target action is low and vice-versa. A supervised trained MLM predicts a consequence of an action within a given transaction according to its transaction properties and transaction events (other actions) that occur before and after the action within the given transaction sequence. A fraud score is updated based on the calculated probabilities (again, the fraud score is higher for lower calculated probabilities and lower for higher calculated probabilities.

It is within this context system 100 is discussed.

System 100 comprises a cloud/server 110, a plurality of transaction terminals 130, and one or more retail servers 120.

Cloud/Server 110 comprises at least one processor 111 and a non-transitory computer-readable storage medium 112. Medium 112 comprises executable instructions for a fraud score manager 113, one or more machine-learning models (algorithms) 114, and a trainer 115. The executable instructions when executed by processor 111 from the medium 112 cause processor 111 to perform operations discussed herein and below with fraud score manager 113, model(s) 114, and trainer 114.

Each transaction terminal 120 comprises a processor 121 and a non-transitory computer-readable storage medium 122. Medium 122 comprises executable instructions for a transaction manager 123 and an event agent 124. The executable instructions when executed by processor 121 from medium 122 cause processor 121 to perform operations discussed herein and below with respect to transaction manager 123 and event agent 124.

Each retail server 130 comprises a processor 131 and a non-transitory computer-readable storage medium 132. Medium 132 comprises executable instructions for a transaction manager 133 and fraud detection system 134. The executable instructions when executed by processor 131 from medium 132 cause processor 131 to perform operations discussed herein and below with respect to transaction manager 133 and fraud detection system 134.

Initial training of model 114 is performed on a variety of labeled data sets by trainer 115. A diversified set of samples as a balanced training set of data is obtained where each target action is labeled within the transaction events (actions) with labels for voided items, returned items, manual price overrides on items, items that appear more than once in a given transaction, multiple items with identical weights in the given transaction, and tender types for payment of the given transaction. Features are then identified for each transaction.

A sample label comprises a binary classification performed on the training set to label items of each transaction for a target action that was or was not performed during the transaction.

The first label is associated with binary classifications on items of each transaction to label the items of a given transaction as to whether the items were associated with and action that is prone to a potential fraud, e.g., 1) voided or not voided; 2) returned or not returned; 3) associated with a price override or not associated with a price override; and 4) paid with cash or not; etc.

Features for labeled targeted items in the training data set comprise the entry method (whether the corresponding item associated with the target action was scanned, tapped, or keyed for entry during the corresponding transaction), the quantity or weight associated with each corresponding item associated with the target action, the department associated with each corresponding item associated with the target action, whether the corresponding item associated with the target action occurs more than once in the corresponding transaction, actions occurring before and after the corresponding item associated with the target action identified in the corresponding transaction, the transaction tender type, the amount of any change returned to the customer for the corresponding transaction, and others.

Each original purchase transaction associated with a return transaction are evaluated together within the training data set, such that each return transaction comprises two transactions that the model 114 utilizes during training: the original purchase transaction and the return transaction.

The training set is balanced between an equal number of transactions that comprise the target actions and a sampling of known transactions that did not include any of the target actions.

The first label in the training set is items within each transaction labels indicating each item is associated with a specific target action or each item having a label indicating it is not associated with the specific target action. The features comprise item price for the target action items, quantity/weight of the target action items, the position of each target action item in the overall transaction sequence, the time and day of the transaction, the entry method of the target action item (keyed, scanned, tapped), the department associated with each target action, the payment tender type, and an amount of change returned in a cash payment transaction.

Trainer 115 trains the model 114 on the training set for identifying the target actions (labels) and features in transactions of the retailer and in known non-fraudulent transactions of the retailer. When a new transaction is finalized, the actions and their labels (voided items, overridden items, etc.) are known. Model 114 can operate on the features of these actions, while hiding the true labels, to predict the label. Then, the predicted label is compared to the true action. In the example of voided items, when the model 114 is applied to a voided item and predicts that it is voided, it is likely to be a legitimate action and thus the corresponding fraud score is low. If the model predicted that is it not voided, this action is not likely to be voided and hence receives a higher fraud score. The fraud score can be inversely computed from the prediction probability emitted by the model 114 (i.e. fraud score=1−probability of actions to occur) and derive an algorithm to output a scalar value for the risk of fraud associated with the whole transaction. Essentially, the model 114 pinpoints contexts within transactions associated with the target actions and assigns a risk or fraud value based on the calculated probabilities for the contexts.

Each targeted action's scalar value is based on the model's calculated probability of that targeted action within its transaction sequence, high probabilities of the action are mapped by the model 114 to lower scalar values for risk and lower probabilities of the targeted action are mapped to the model 114 to higher scalar values for risk.

The scalar value of risk outputted by the model 114 for a given transaction is provided by fraud score manager 113 to fraud detection system 124. The scalar value of risk can be added to or can augment the fraud detection system's overall fraud score, which may include a second fraud score with respect to the cashier performing the transaction. In some cases, the scalar value is compared to a threshold by fraud detection system 124 and alerts are raised when the scalar value outputted by model 114 and provided by fraud score manager exceeds that threshold.

After trainer 115 has trained and derived model 114, system 100 is ready for predicting a given target action's probability for a given transaction and outputting a risk or fraud scalar value associated with a degree of risk for fraud based on the target's action probability within the transaction sequence for the given transaction.

Transaction events/actions are provided by event manager 134 for a transaction to fraud score manager 113 as they occur in a transaction or after a transaction is processed on terminal 130 by transaction manager 133. The transaction sequence of events and transaction details (price, payment tender type, item weights, item quantities, etc.) are assembled into an input record and provided as input to model 114. Model 114 returns an output scalar value that corresponds to the degree of risk associated with the target action identified in the transaction sequence. Score manager 113 feeds the scalar risk value for the target action of the transaction to fraud detection system 124 where an alert may be raised based solely on the scalar value or based on other fraud scoring and analysis performed by fraud detection system in view of the scalar value provided by model 114.

Trainer 115 may also continuously re-train model 114 on transaction records of the store with up-to-date actions. In this way, model 114 is adaptive and learns over time, since as time goes by sales patterns change along with fraud patterns. The model 114 automatically adapts and fine-tunes itself as it is re-trained by trainer 115.

In an embodiment, system 100 is provided as a Software-as-a-Service (SaaS) through cloud 110 to retail server 120 and terminal 130 using an Application Programming Interface (API) from and to fraud score manager 113 to event agent 134 and fraud detection system 124.

In an embodiment, event agent 134 obtains the events for a given item of a transaction from an event log and reports the item events for the transaction to fraud score manager 113.

In an embodiment, event agent 134 monitors transaction processing by transaction manager 133 and accumulates the item events in sequential order and reports the set of item events when a transaction complete event is detected from transaction manager 133.

In an embodiment, transaction terminal 130 is a Point-Of-Sale (POS) terminal, a Self-Service Terminal (SST), or a kiosk.

In an embodiment, fraud score manager 113, model 114, and trainer 115 may be subsumed into and executed on retailer server 120.

In an embodiment, transaction manager 123 and/or fraud detection system 124 may be subsumed into and executed on cloud/server 110.

In an embodiment, fraud score manager 113 can be run in a batch mode at the end of each day or other preconfigured intervals of time, in which the transaction event logs for the interval of time are provided and the scalar fraud or risk score for each transaction during the interval returned back to fraud detection system 124. Fraud detection system 124 may link identified fraudulent transactions of a given retailer to video clips of security video for visually auditing suspect transactions.

The above-referenced embodiments and other embodiments are now discussed with reference to FIG. 2.

Figure 2:
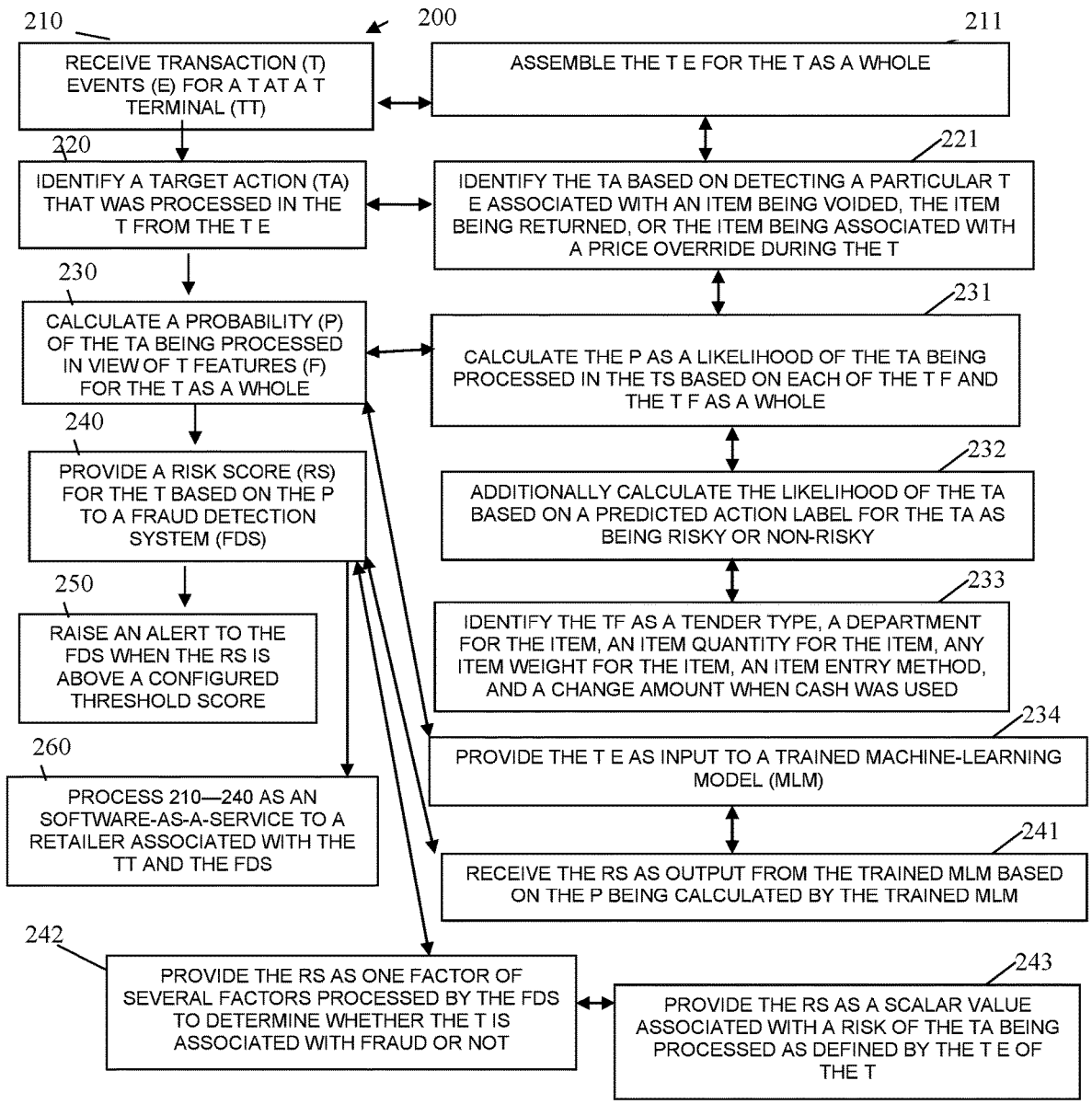
FIG. 2 is a diagram of a method for distinguishing between risky and legitimate transaction actions in a transaction, according to an example embodiment.

FIG. 2 is a diagram of a method 200 for distinguishing between risky and legitimate transaction actions in a transaction, according to an example embodiment. The software module(s) that implements the method 200 is referred to as a "transaction action risk assessor." The transaction action risk assessor is implemented as executable instructions programmed and residing within memory and/or a non-transitory computer-readable (processor-readable) storage medium and executed by one or more processors of one or more devices. The processor(s) of the device(s) that executes the transaction action risk assessor are specifically configured and programmed to process the transaction action risk assessor. The transaction action risk assessor has access to one or more network connections during its processing. The connections can be wired, wireless, or a combination of wired and wireless.

In an embodiment, the device that executes the transaction action risk assessor is cloud 110. In an embodiment, the device that executes transaction action risk assessor is server 110.

In an embodiment, the transaction action risk assessor is all of, or some combination of fraud score manager 113, model(s) 114, and/or trainer 115.

At 210, transaction action risk assessor receives transaction events for a transaction being processed on a transaction terminal 130.

In an embodiment, at 211, the transaction action risk assessor assembles the transaction events for the transaction as a whole for each transaction event that was received from the transaction terminal 130.

At 220, the transaction action risk assessor identifies a target action that was processed in the transaction from the transaction events.

In an embodiment of 211 and 220, at 221, the transaction action risk assessor identifies the target action based on detecting a particular transaction event in the transaction associated with an item being voided, an item being returned, or the item being associated with a price override during the transaction.

At 230, the transaction action risk assessor calculates a probability of the target action being processed in view of transaction features of the transaction as a whole.

In an embodiment of 221 and 230, at 231, the transaction action risk assessor calculates the probability as a likelihood of the target action being processed based on each of the transaction features and the transaction features as a whole.

In an embodiment of 231 and at 232, the transaction action risk assessor additionally calculates the likelihood based on a predicted action label for the target action as being risky or non-risky.

In an embodiment of 232 and at 233, the transaction action risk assessor identifies the transaction features as a tender type used for payment of the transaction, a department associated with the item, an item quantity for the item, any item weight recorded for the item, an item entry method (scan, tap, keyed in), and a change amount when the tender type was cash.

In an embodiment, at 234, the transaction action risk assessor provides the transaction events as input to a trained MLM 114.

At 240, the transaction action risk assessor provides a risk score for the transaction based on the probability to a fraud detection system 124.

In an embodiment of 234 and 240, at 241, the transaction action risk assessor receives the risk score as output from the trained MLM 114 based on the probability being calculated by the trained MLM 114.

In an embodiment, at 242, the transaction action risk assessor provides the risk score as one factor of several factors processed by the fraud detection system 124 to determine whether the transaction is associated with fraud or not.

In an embodiment of 242 and at 243, the transaction action risk assessor provides the risk score as a scalar value associated with a risk of the target action being processed as was defined by the transaction events of the transaction.

In an embodiment, at 250, the transaction action risk assessor raises an alert to the fraud detection system 124 when the risk score is above a configured threshold score.

In an embodiment, at 260, the transaction action risk assessor is processed as SaaS to a retailer associated with the transaction terminal 130 and the fraud detection system 124.

Figure 3:
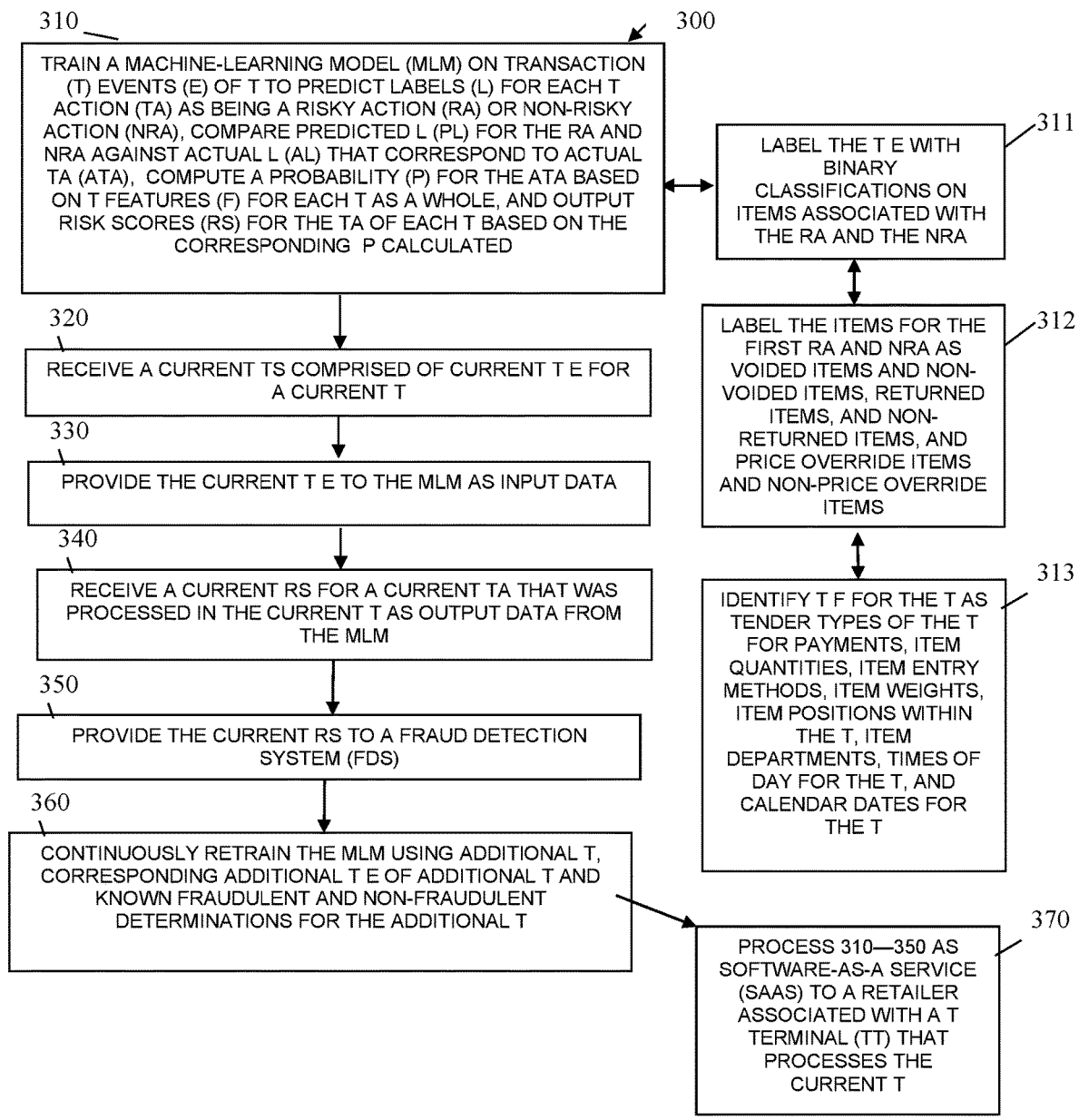
FIG. 3 is a diagram of another method for distinguishing between risky and legitimate transaction actions in a transaction, according to an example embodiment.

FIG. 3 is a diagram of another method 300 for distinguishing between risky and legitimate transaction actions in a transaction, according to an example embodiment. The software module(s) that implements the method 300 is referred to as a "transaction action fraud scorer." The transaction action fraud scorer is implemented as executable instructions programmed and residing within memory and/or a non-transitory computer-readable (processor-readable) storage medium and executed by one or more processors of one or more devices. The processor(s) of the device(s) that executes the transaction action fraud scorer are specifically configured and programmed to process the transaction action fraud scorer. The transaction action fraud scorer has access to one or more network connections during its processing. The network connections can be wired, wireless, or a combination of wired and wireless.

In an embodiment, the device that executes the transaction action fraud scorer is cloud 110. In an embodiment, the device that executes the transaction action fraud scorer is server 110.

In an embodiment, the transaction action fraud scorer is all of, or some combination of fraud score manager 113, model(s) 114, trainer 115, and/or method 200.

The transaction action fraud scorer presents another and, in some ways, enhanced processing perspective from that which was discussed above with the method 200 of the FIG. 2.

At 310, the transaction action fraud scorer trains a MLM 114 on transaction events of transactions to predict labels for each transaction action as being a risky action or a non-risky action, to compare predicted action labels for the risky action and non-risky actions against actual labels that correspond to actual transaction actions, to compute a probability for the actual transaction actions based on the transaction features for each transaction as a whole, and to output risk scores for the transaction actions of each transaction based on the corresponding probabilities calculated.

In an embodiment, at 311, the transaction action fraud scorer labels with binary classifications on items associated with the risky actions and the non-risky actions.

In an embodiment of 311 and at 312, the transaction action fraud scorer labels the items for the risky actions as voided items and non-voided items, returned items and non-returned items, and price override items and non-price override items.

In an embodiment of 312 and at 313, the transaction action fraud scorer identifies the transaction features for the transactions as tender types of the transactions for payments, item quantities, item entry methods, item weights, item positions within the transaction sequences, item departments, times-of-day for the transactions, and calendar dates for the transactions.

At 320, the transaction action fraud scorer receives a current transaction comprised of current transaction events for a current transaction.

At 330, the transaction action fraud scorer provides the current transaction events to the MLM 114 as input date.

At 340, the transaction action fraud scorer receives a current risk score for a current transaction action that was processed in the current transaction as output data from the MLM 114.

At 350, the transaction action fraud scorer provides the current risk score to a fraud detection system 124.

In an embodiment, at 360, the transaction action fraud scorer continuously retrains the MLM 114 using additional transactions, corresponding additional transaction events of the additional transactions and known fraudulent and non-fraudulent determinations for the additional transactions.

In an embodiment, at 370, the transaction action fraud scorer is provided and processed as a SaaS to a retailer associated with a transaction terminal 130 that processes the current transaction.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   training a machine-learning model on transaction events of transactions and transaction features for the transaction events to predict labels for each transaction action as being a risky action or a non-risky action, compare predicted labels for the risky actions and non-risky predicted labels against actual labels that correspond to actual transaction actions, compute a probability for the actual transaction actions based on transaction features of each transaction as a whole, and output risk scores for the transaction actions of each transaction based on the corresponding probabilities calculated, wherein the transaction features at least include preceding transaction events occurring in the transaction before each transaction action for the corresponding transaction and post transaction events occurring after each transaction action in the corresponding transaction, any first items appearing in the corresponding transaction more than once, and any second items appearing in the corresponding transaction with a same transaction weight;

receiving a current transaction comprised of current transaction events for a current transaction;

providing the current transaction events in the current transaction to the machine-learning model as input data;

receiving a current risk score for a current transaction action that was processed in the current transaction as output data from the machine-learning model; and providing the current risk score to a fraud detection system, using the risk score in combination with a fraud score made independently by the fraud system for the current transaction, and determining whether the current transaction is fraudulent or not based on the risk score and the fraud score of the fraud detection system.

2. The method of claim 1 further comprising, continuously retraining the machine-learning model using additional transactions, corresponding additional transaction events of the additional transactions and known fraudulent and non-fraudulent determinations for the additional transactions.

3. The method of claim 1, wherein training further includes labeling the transaction events with binary classifications on items associated with risky actions and the non-risky actions.

4. The method of claim 3, wherein labeling further includes labeling the items for the risky actions and non-risky actions as voided items and non-voided items, returned items and non-returned items, and price override items and non-price override items.

5. The method of claim 1, wherein labeling further includes identifying the transaction features for the transactions as tender types of the transactions used for payments, item quantities, item entry methods, item prices, item weights, item positions within the transactions, item departments, times of day for the transactions, and calendar dates for the transactions.

6. The method of claim 1 further comprising, processing the method as a Software-as-a-Service (SaaS) to a retailer associated with a transaction terminal that processes the current transaction.

7. A system, comprising:
a cloud server comprising at least one processor and a non-transitory computer-readable storage medium;
the non-transitory computer-readable storage medium comprises executable instructions;
the executable instructions when provided to and executed by the at least one processor from the non-transitory computer-readable storage medium cause the at least one processor to perform operations comprising:
training a machine-learning model to calculate probabilities associated with transaction actions being processed in training transactions based on predicted labels of a risky action or a non-risky action for each of the training transactions that are compared against actual transaction actions of each of the training transactions and a calculated probability for each actual transaction action is calculated using transaction features associated with each transaction as a whole, a risk score for each transaction is output by the machine-learning, wherein the features of each transaction at least includes preceding transaction actions occurring in the transaction before each transaction action for the corresponding transaction and post transaction actions occurring after each transaction action in the corresponding transaction, any first items appearing in the corresponding transaction more than once, and any second items appearing in the corresponding transaction with a same transaction weight;
providing a current transaction that comprises current transaction actions and current transaction features for the current transaction as a whole to the machine-learning model as input;
receiving a current risk score for at least one current transaction action that was processed in the current transaction as output from the machine-learning model; and
providing the current risk score to a fraud detection system, using the risk score in combination with a fraud score made independently by the fraud system for the current transaction, and determining whether the current transaction is fraudulent or not based on the risk score and the fraud score of the fraud detection system.

8. The system of claim 7, wherein the executable instructions are accessible as a Software-as-a-Service (SaaS) to a retailer server associated with a retailer that processes the current transaction on a transaction terminal of the retailer at a retail store.

* * * * *